(12) United States Patent
Mani et al.

(10) Patent No.: US 10,999,418 B2
(45) Date of Patent: *May 4, 2021

(54) ESTIMATING AVERAGED NOISE COMPONENT IN A MICROPHONE SIGNAL

(71) Applicant: Imagination Technologies Limited, Kings Langley (GB)

(72) Inventors: Senthil Kumar Mani, Hyderabad (IN); Sowmya Mannava, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 129 days.

This patent is subject to a terminal disclaimer.

(21) Appl. No.: 16/502,459

(22) Filed: Jul. 3, 2019

(65) Prior Publication Data
US 2019/0327352 A1    Oct. 24, 2019

Related U.S. Application Data

(62) Division of application No. 14/927,805, filed on Oct. 30, 2015, now Pat. No. 10,389,861.

(30) Foreign Application Priority Data

Oct. 30, 2014    (GB) ...................................... 1419353

(51) Int. Cl.
*H04M 1/20*    (2006.01)
*H04B 3/23*    (2006.01)
(Continued)

(52) U.S. Cl.
CPC ........... *H04M 1/20* (2013.01); *G10L 21/0208* (2013.01); *G10L 21/0216* (2013.01);
(Continued)

(58) Field of Classification Search
CPC ...... H04M 1/20; H04M 1/6033; H04M 9/082; H04B 3/234; G10L 21/0216;
(Continued)

(56) References Cited

U.S. PATENT DOCUMENTS 5,274,705 A   12/1993 Younce et al.
5,732,134 A    3/1998 Sih
(Continued)

FOREIGN PATENT DOCUMENTS

| EP | 1111806 A2 | 3/2000 |
| EP | 2101480 A2 | 9/2009 |
| EP | 2701145 A1 | 2/2014 |

OTHER PUBLICATIONS

Alberto Gonzalez, Miguel Ferrer, Felix Abu, and Maria de Diego, "Affine Projection algorithms—evolution to smart and fast Algorithms and applications", 20th European Signal Processing Conference (EUSIPCO 2012) Bucharest, Romania, Aug. 27-31, 2012.

(Continued)

*Primary Examiner* — Lisa Hashem
(74) *Attorney, Agent, or Firm* — Potomac Law Group, PLLC; Vincent M DeLuca

(57) ABSTRACT

A controller for an acoustic echo canceller includes a noise estimator configured to estimate a level of noise that is comprised in a microphone signal relative to an echo component, estimated by the acoustic echo canceller, comprised in the microphone signal. The controller further includes a control module configured to control the acoustic echo canceller in dependence on that estimate.

15 Claims, 11 Drawing Sheets

(51) Int. Cl.
    *G10L 21/0208*    (2013.01)
    *H04M 9/08*    (2006.01)
    *G10L 21/0216*    (2013.01)
    *H04M 1/60*    (2006.01)

(52) U.S. Cl.
    CPC .......... *H04B 3/234* (2013.01); *H04M 1/6033* (2013.01); *H04M 9/082* (2013.01); *G10L 2021/02082* (2013.01); *G10L 2021/02168* (2013.01)

(58) Field of Classification Search
    CPC ....... G10L 21/0208; G10L 2021/02168; G10L 2021/02082
    See application file for complete search history.

(56) References Cited

U.S. PATENT DOCUMENTS

| | | | |
|---|---|---|---|
| 6,160,886 | A | 12/2000 | Romesburg et al. |
| 6,507,653 | B1 | 1/2003 | Romesburg |
| 6,570,985 | B1 | 5/2003 | Romesburg |
| 6,842,516 | B1 | 1/2005 | Armbruster |
| 7,539,300 | B1 | 5/2009 | Benyassine et al. |
| 7,773,741 | B1 | 8/2010 | LeBlanc et al. |
| 8,565,415 | B2 | 10/2013 | Schmidt et al. |
| 9,706,057 | B2 | 7/2017 | Mani et al. |
| 2002/0041678 | A1 | 4/2002 | Basburg-Ertem et al. |
| 2002/0064139 | A1 | 5/2002 | Bist et al. |
| 2003/0043999 | A1* | 3/2003 | Farrell .................. H04B 3/234 379/406.01 |
| 2006/0018460 | A1 | 1/2006 | McCree |
| 2006/0098807 | A1 | 5/2006 | Page et al. |
| 2006/0149542 | A1* | 7/2006 | Tanrikulu .............. H04M 9/082 704/233 |
| 2007/0047731 | A1 | 3/2007 | Lipari et al. |
| 2008/0212567 | A1* | 9/2008 | El-Hennawey ......... H04L 65/80 370/352 |
| 2009/0028355 | A1 | 1/2009 | Ishiguro |
| 2009/0238373 | A1 | 9/2009 | Klein |
| 2011/0124380 | A1 | 5/2011 | Wang |
| 2012/0237018 | A1 | 9/2012 | Barron et al. |
| 2012/0250882 | A1 | 10/2012 | Mohammad et al. |
| 2014/0064476 | A1 | 3/2014 | Mani et al. |
| 2014/0112488 | A1 | 4/2014 | Kim et al. |
| 2014/0270149 | A1* | 9/2014 | Xu ........................ H04M 3/002 379/406.08 |
| 2014/0328490 | A1 | 11/2014 | Mohammad et al. |
| 2015/0189433 | A1 | 7/2015 | Ganeshkumar |
| 2015/0332704 | A1 | 11/2015 | Sun et al. |
| 2016/0012813 | A1 | 1/2016 | Every et al. |
| 2016/0019909 | A1 | 1/2016 | Shi et al. |
| 2016/0127561 | A1 | 5/2016 | Mani et al. |
| 2018/0033447 | A1* | 2/2018 | Ramprashad ......... G10L 21/028 |
| 2019/0172476 | A1* | 6/2019 | Wung .................. G10L 21/0205 |
| 2020/0027472 | A1* | 1/2020 | Huang ................... H04R 1/406 |

OTHER PUBLICATIONS

Qi Zhang, Yuancheng Yao, Mingwei Qin "An Uncorrelated Variable Step-size LMS Adaptive Algorithm", Journal of Emerging Trends in Computing and Information Sciences, vol. 3, Nov. 2012.

Leonard Rey Vega, Heman Rey, Jacob Benesty, and Sara Tressens, "A New Robust Variable Step-size NLMS Algorithm," IEEE Transactions on Signal Processing, vol. 56, No. 5, May 2008.

Alberto Carini, "The Road of an Acoustic Echo Controller for Mobile Telephony From Product Definition Till Production", International Workshop on Acoustic Signal Enhancement, 2001.

Felix Albu, Constantin Paleogu, and Jacob Benesty "Gauss-seidel based Variable Step-size Affine Projection Algorithm for acoustic echo cancellation", 17th European Signal Processing Conference (EUSIPCO 2009) Glasgiw, Scotland, Aug. 24-28, 2009.

Senthil Kumar Mani and Bala Manikya Prasad Puram, "Projection Based Near end Speech Detectors for Time Domain Adaptive Echo Cancellation" in International Journal of in International Journal of Recent Trends in Engineering, vol. 1, No. 3, May 2009, India.
(*NOTE* above NPL in parent apn).

* cited by examiner

ESTIMATING AVERAGED NOISE COMPONENT IN A MICROPHONE SIGNAL

CROSS-REFERENCE TO RELATED APPLICATIONS AND CLAIM OF PRIORITY

This application is a division under 35 U.S.C. 120 of copending Application Ser. No. 14/927,805 filed Oct. 30, 2015, which claims foreign priority under 35 U.S.C. 119 from United Kingdom Application No. 1419353.6 filed Oct. 30, 2014.

BACKGROUND

In telephony, audio signals (e.g. including voice signals) are transmitted between a near-end and a far-end. Far-end signals which are received at the near-end may be outputted from a loudspeaker at the near-end. A microphone at the near-end may be used to capture a near-end signal to be transmitted to the far-end (such as the voice of a speaker at the near-end). An "echo" occurs when at least some of the far-end signal outputted at the near-end is included in the near-end signal which is transmitted back to the far-end. In this sense the echo may be considered to be a reflection of the far-end signal.

An example scenario is illustrated in FIG. 1, which shows a signal being captured by a far-end microphone and output by a near-end loudspeaker. The echo is a consequence of acoustic coupling between the near-end loudspeaker and the near-end microphone; the microphone captures the signal originating from its own loudspeaker in addition to the voice of the near-end speaker and any near-end background noise. The result is an echo at the far-end loudspeaker. Echo cancellation is an important feature of telephony. Hands-free devices and teleconferencing, in particular, require echo cancellation that can adapt to environments having a wide range of acoustic characteristics. In these examples, a combination of factors contributes to echo being more of an issue. First, the volume at which the far-end signal is outputted from the near-end loudspeaker is typically loud enough that the far-end signal is a significant part of the signal captured by the near-end microphone. Second, the physical arrangement of the loudspeaker and microphone in these types of arrangements tends to result in a good acoustic coupling between the two.

Acoustic echo cancellers can be used to remove echo from a microphone signal. They typically model the acoustic echo path and use that model to synthesise an estimate of the echo from the far-end signal. Often, an adaptive filter is used to model the impulse response of the acoustic echo path. The estimated echo is subtracted from the microphone signal to produce a substantially echo-free signal for transmission to the far-end. This technique requires adaptive signal processing to generate a signal accurate enough to cancel the echo effectively.

An environment's acoustic response tends to vary with time, so the adaptive filter needs to change its model to mimic changes in the real environment—otherwise the adaptive filter's estimate of the echo is likely to differ from the real echo, leading to imperfect echo cancellation. This is usually achieved by updating the adaptive filter's coefficients to take account of any differences between the estimated echo that the adaptive filter is synthesising and the real echo detected by the microphone. The "real echo" is often not available in isolation, as it is just one of several signal components in the microphone signal. To get around this problem, the microphone signal is normally taken to represent the echo during so-called "echo-alone" regions. These are regions in which there is no other significant signal component (such as near-end speech, for example) detected in the microphone signal except ambient background noise which is typically present, even during "echo-alone" regions. The error that is fed back to control the adaptation of the adaptive filter will almost always be at least partially influenced by noise. Therefore, there is a need for an improved mechanism for controlling an AEC.

SUMMARY OF THE INVENTION

According to a first embodiment, there is provided a controller for an acoustic echo canceller. The controller includes a noise estimator configured to estimate a level of noise that is comprised in a microphone signal relative to an echo component, estimated by the acoustic echo canceller, comprised in the microphone signal. The controller further includes a control module configured to control the acoustic echo canceller in dependence on that estimate.

The echo component may represent at least part of a far-end signal outputted by a loudspeaker. The noise estimator may be configured to obtain an initial estimate of the noise level by estimating a level of the microphone signal during a delay between the far-end signal being outputted by the loudspeaker and the echo component formed therefrom becoming part of the microphone signal.

The noise estimator may be configured to update the initial estimate by estimating a level of one or more frames of the microphone signal that comprise the echo component and forming a current estimate of the noise level to comprise a first proportion of the initial estimate and a second proportion of the estimated level of the one or more frames that comprise the echo component.

The noise estimator may be configured to select the first and second proportions by determining whether or not the current noise estimate is above a threshold.

The noise estimator may be configured to, before forming a new current noise estimate: compare the one or more frames of the microphone signal that comprise the echo component with the current noise estimate; and if the estimated level of the one or more frames is lower than the current noise estimate, form the new current noise estimate to comprise a greater proportion of the estimated level of the one or more frames than if the estimated level of those frames is less than or equal to the current noise estimate.

The noise estimator may be configured to estimate the noise level relative to the echo component by comparing an estimated noise level for the microphone signal with a level of the microphone signal.

The noise estimator may be configured to estimate the noise level relative to the echo component by calculating the echo-to-noise ratio of the microphone signal.

The controller may comprise an echo estimator configured to estimate a level of the echo component that is comprised in the microphone signal.

The control module may be configured to control the acoustic echo canceller in dependence on the estimated echo level.

The echo estimator may be configured to estimate the echo level by subtracting the estimated noise level from a level of the microphone signal.

The echo component may represent at least part of a far-end signal outputted by a loudspeaker. The echo estimator may be configured to estimate the echo level relative to a level of the far-end signal.

The echo estimator may be configured to estimate the echo level relative to the far-end signal level by calculating the echo return loss of the microphone signal.

The control module may be configured to control the acoustic echo canceller by controlling an adaptive filter comprised in the acoustic echo canceller.

The control module may be configured to control how responsive the adaptive filter is to changes in the microphone signal.

The control module may be configured to control the responsiveness of the adaptive filter by adjusting an adaptation factor that controls how the adaptive filter's coefficients are adapted in response to changes in the microphone signal.

The control module may be configured to select between two or more adaptation factors in dependence on the estimated noise level relative to the echo component.

The control module may be configured to select the two or more adaptation factors to select between in dependence on the estimated echo level relative to the far-end signal level.

The control module may be configured to control the acoustic echo canceller by controlling a double-talk detector comprised in the acoustic echo canceller.

The control module may be configured to control a mechanism by which the double talk detector detects double talk in the microphone signal in dependence on the echo level relative to the far-end signal level.

The control module may be configured to control the acoustic echo canceller by controlling a non-linear processor comprised in the acoustic echo canceller.

The control module may be configured to adjust a threshold above which the non-linear threshold clips an echo-cancelled signal in dependence on the echo level relative to the far-end signal level.

The control module may be configured to select between two or more thresholds in dependence on the estimated noise level relative to the echo component.

According to a second embodiment, there is provided a method for controlling an acoustic echo canceller. The method includes a controller estimating a level of noise that is comprised in a microphone signal relative to an echo component, estimated by the acoustic echo canceller, comprised in the microphone signal. The method further includes the controller controlling the acoustic echo canceller in dependence on that estimate.

The echo component may represent at least part of a far-end signal outputted by a loudspeaker. The method may comprise obtaining an initial estimate of the noise level by estimating a level of the microphone signal during a delay between the far-end signal being outputted by the loudspeaker and the echo component formed therefrom becoming part of the microphone signal.

The method may comprise updating the initial estimate by estimating a level of one or more frames of the microphone signal that comprise the echo component and forming a current estimate of the noise level to comprise a first proportion of the initial estimate and a second proportion of the estimated level of the one or more frames that comprise the echo component.

The method may comprise selecting the first and second proportions by determining whether or not the current noise estimate is above a threshold.

The method may comprise, before forming a new current noise estimate: comparing the one or more frames of the microphone signal that comprise the echo component with the current noise estimate; and if the estimated level of the one or more frames is lower than the current noise estimate, forming the new current noise estimate to comprise a greater proportion of the estimated level of the one or more frames than if the estimated level of those frames is less than or equal to the current noise estimate.

The method may comprise estimating the noise level relative to the echo component by comparing an estimated noise level for the microphone signal with a level of the microphone signal.

The method may comprise estimating the noise level relative to the echo component by calculating the echo-to-noise ratio of the microphone signal.

The method may comprise estimating a level of the echo component that is comprised in the microphone signal.

The method may comprise controlling the acoustic echo canceller in dependence on the estimated echo level.

The method may comprise estimating the level of the echo component by subtracting the estimated noise level from a level of the microphone signal.

The echo component represents at least part of a far-end signal outputted by a loudspeaker. The method may comprise estimating the echo level relative to a level of the far-end signal.

The method may comprise estimating the echo level relative to the far-end signal level by calculating the echo return loss of the microphone signal.

The method may comprise controlling the acoustic echo canceller by controlling an adaptive filter comprised in the acoustic echo canceller.

The method may comprise controlling how responsive the adaptive filter is to changes in the microphone signal.

The method may comprise controlling the responsiveness of the adaptive filter by adjusting an adaptation factor that controls how the adaptive filter's coefficients are adapted in response to changes in the microphone signal.

The method may comprise selecting between two or more adaptation factors in dependence on the estimated noise level relative to the echo component.

The method may comprise selecting the two or more adaptation factors to select between in dependence on the estimated echo level relative to the far-end signal level.

The method may comprise comprising controlling the acoustic echo canceller by controlling a double-talk detector comprised in the acoustic echo canceller.

The method may comprise controlling a mechanism by which the double talk detector detects double talk in the microphone signal in dependence on the echo level relative to the far-end signal level.

The method may comprise comprising controlling the acoustic echo canceller by controlling a non-linear processor comprised in the acoustic echo canceller.

The method may comprise adjusting a threshold above which the non-linear threshold clips an echo-cancelled signal in dependence on the echo level relative to the far-end signal level.

The method may comprise selecting between two or more thresholds in dependence on the estimated noise level relative to the echo component.

According to a third embodiment, there is provided a controller for an acoustic echo canceller, the acoustic echo canceller being configured to estimate an echo component comprised in a microphone signal, the controller comprising a noise estimator configured to estimate a level of noise that is comprised in the microphone signal relative to the echo component, an echo estimator configured to estimate a level of the echo component that is comprised in the microphone signal and a control module configured to control an operational characteristic of the acoustic echo canceller in dependence on both of those estimates.

Other embodiments may include one or more of the following:

The control module may be configured to control the operational characteristic by controlling an adaptive filter that is comprised in the acoustic echo canceller. The control module may be configured to control how responsive the adaptive filter is to changes in the microphone signal. The control module may be configured to control the responsiveness of the adaptive filter by adjusting an adaptation factor that controls how the adaptive filter's coefficients are adapted in response to changes in the microphone signal. The control module may be configured to select between two or more adaptation factors in dependence on the estimated noise level relative to the echo component. The control module may be configured to select the two or more adaptation factors in dependence on the estimated echo level.

The control module may be configured to control a mode of operation of a communication device by controlling the operational characteristic of the acoustic echo canceller. The control module may be configured to control the operational characteristic by controlling a non-linear processor comprised in the acoustic echo canceller. The control module may be configured to control a threshold above which the non-linear processor clips an echo-cancelled signal. The control module may be configured to control the non-linear processor threshold in dependence on the estimated echo level if the estimated echo level is below a predetermined threshold and to otherwise control the non-linear processor threshold in dependence on the estimated level of noise relative to the echo component.

The control module may be configured to control the acoustic echo canceller by controlling a double-talk detector comprised in the acoustic echo canceller. The control module may be configured to control a mechanism by which the double talk detector detects double talk in the microphone signal in dependence on the estimated echo level.

The echo component may represent at least part of a far-end signal outputted by a loudspeaker. The noise estimator may be configured to obtain an initial estimate of the noise level by estimating a level of the microphone signal during a delay between the far-end signal being outputted by the loudspeaker and the echo component formed therefrom becoming part of the microphone signal. The noise estimator may be configured to update the initial estimate by estimating a level of one or more frames of the microphone signal that comprise the echo component and forming a current estimate of the noise level to comprise a first proportion of the initial estimate and a second proportion of the estimated level of the one or more frames that comprise the echo component. The noise estimator may be configured to select the first and second proportions by determining whether or not the current noise estimate is above a threshold. The noise estimator may be configured to, before forming a new current noise estimate: compare the one or more frames of the microphone signal that comprise the echo component with the current noise estimate; and if the estimated level of the one or more frames is lower than the current noise estimate, form the new current noise estimate to comprise a greater proportion of the estimated level of the one or more frames than if the estimated level of those frames is less than or equal to the current noise estimate. The noise estimator may be configured to estimate the noise level relative to the echo component by comparing an estimated noise level for the microphone signal with a level of the microphone signal.

The noise estimator may be configured to estimate the noise level relative to the echo component by calculating the echo-to-noise ratio of the microphone signal.

The echo estimator may be configured to estimate the echo level by subtracting the estimated noise level from a level of the microphone signal. The echo component may represent at least part of a far-end signal outputted by a loudspeaker. The echo estimator may be configured to estimate the echo level by estimating the echo level relative to the far-end signal level. The echo estimator may be configured to estimate the echo level by calculating the echo return loss of the microphone signal.

According to a fourth embodiment, there is provided a method for controlling an acoustic echo canceller that is configured to estimate an echo component comprised in a microphone signal, the method comprising estimating a level of noise that is comprised in the microphone signal relative to the echo component, estimating a level of the echo component that is comprised in the microphone signal and controlling an operational characteristic of the acoustic echo canceller in dependence on both of those estimates.

Other embodiments may include one or more of the following:

The method may comprise controlling the operational characteristic by controlling an adaptive filter that is comprised in the acoustic echo canceller. The method may comprise controlling how responsive the adaptive filter is to changes in the microphone signal. The method may comprise controlling the responsiveness of the adaptive filter by adjusting an adaptation factor that controls how the adaptive filter's coefficients are adapted in response to changes in the microphone signal. The method may comprise selecting between two or more adaptation factors in dependence on the estimated noise level relative to the echo component. The method may comprise selecting the two or more adaptation factors in dependence on the estimated echo level.

The method may comprise controlling a mode of operation of a communication device by controlling the operational characteristic of the acoustic echo canceller. The method may comprise controlling the operational characteristic by controlling a non-linear processor comprised in the acoustic echo canceller. The method may comprise controlling a threshold above which the non-linear processor clips an echo-cancelled signal. The method may comprise controlling the non-linear processor threshold in dependence on the estimated echo level if the estimated echo level is below a predetermined threshold and otherwise controlling the non-linear processor threshold in dependence on the estimated level of noise relative to the echo component.

The method may comprise controlling the acoustic echo canceller by controlling a double-talk detector comprised in the acoustic echo canceller. The method may comprise controlling a mechanism by which the double talk detector detects double talk in the microphone signal in dependence on the estimated echo level.

The echo component may represent at least part of a far-end signal outputted by a loudspeaker. The method may comprise obtaining an initial estimate of the noise level by estimating a level of the microphone signal during a delay between the far-end signal being outputted by the loudspeaker and the echo component formed therefrom becoming part of the microphone signal. The method may comprise updating the initial estimate by estimating a level of one or more frames of the microphone signal that comprise the echo component and forming a current estimate of the noise level to comprise a first proportion of the initial estimate and a second proportion of the estimated level of the one or more frames that comprise the echo component. The method may comprise selecting the first and second proportions by determining whether or not the current noise estimate is above a threshold. The method may comprise, before forming a new current noise estimate, comparing the one or more frames of the microphone signal that comprise the echo component with the current noise estimate and if the estimated level of the one or more frames is lower than the current noise estimate, forming the new current noise estimate to comprise a greater proportion of the estimated level of the one or more frames than if the estimated level of those frames is less than or equal to the current noise estimate. The method may comprise estimating the noise level relative to the echo component by comparing an estimated noise level for the microphone signal with a level of the microphone signal. The method may comprise estimating the noise level relative to the echo component by calculating the echo-to-noise ratio of the microphone signal.

The method may comprise estimating the echo level by subtracting the estimated noise level from a level of the microphone signal. The echo component may represent at least part of a far-end signal outputted by a loudspeaker. The method may comprise estimating the echo level by estimating the echo level relative to the far-end signal level. The method may comprise estimating the echo level by calculating the echo return loss of the microphone signal.

According to a fifth embodiment, there is provided machine readable program instructions for implementing the above method.

According to a sixth embodiment, there is provided machine readable storage medium having encoded thereon non-transitory machine-readable program instructions for implementing the above method.

BRIEF DESCRIPTION OF THE DRAWINGS

The present invention will now be described by way of example with reference to the accompanying drawings. In the drawings.

DETAILED DESCRIPTION

Figure 1:
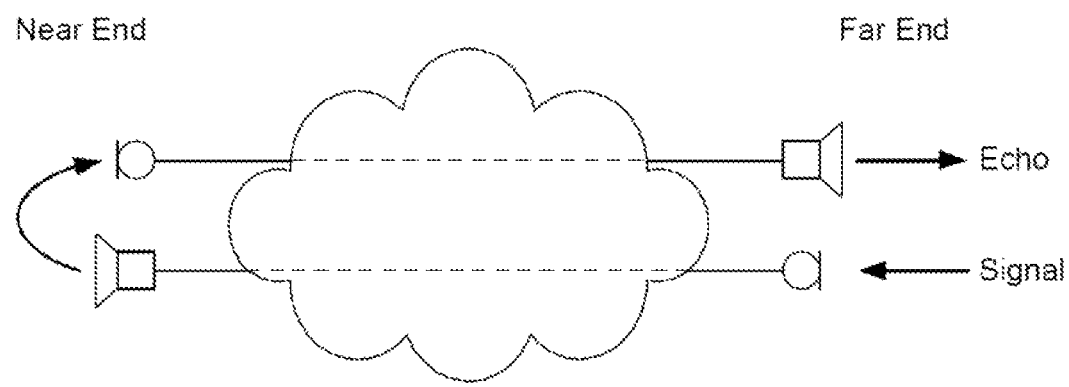
FIG. 1 shows an architecture of an exemplary echo path monitoring system.
Figure 2:
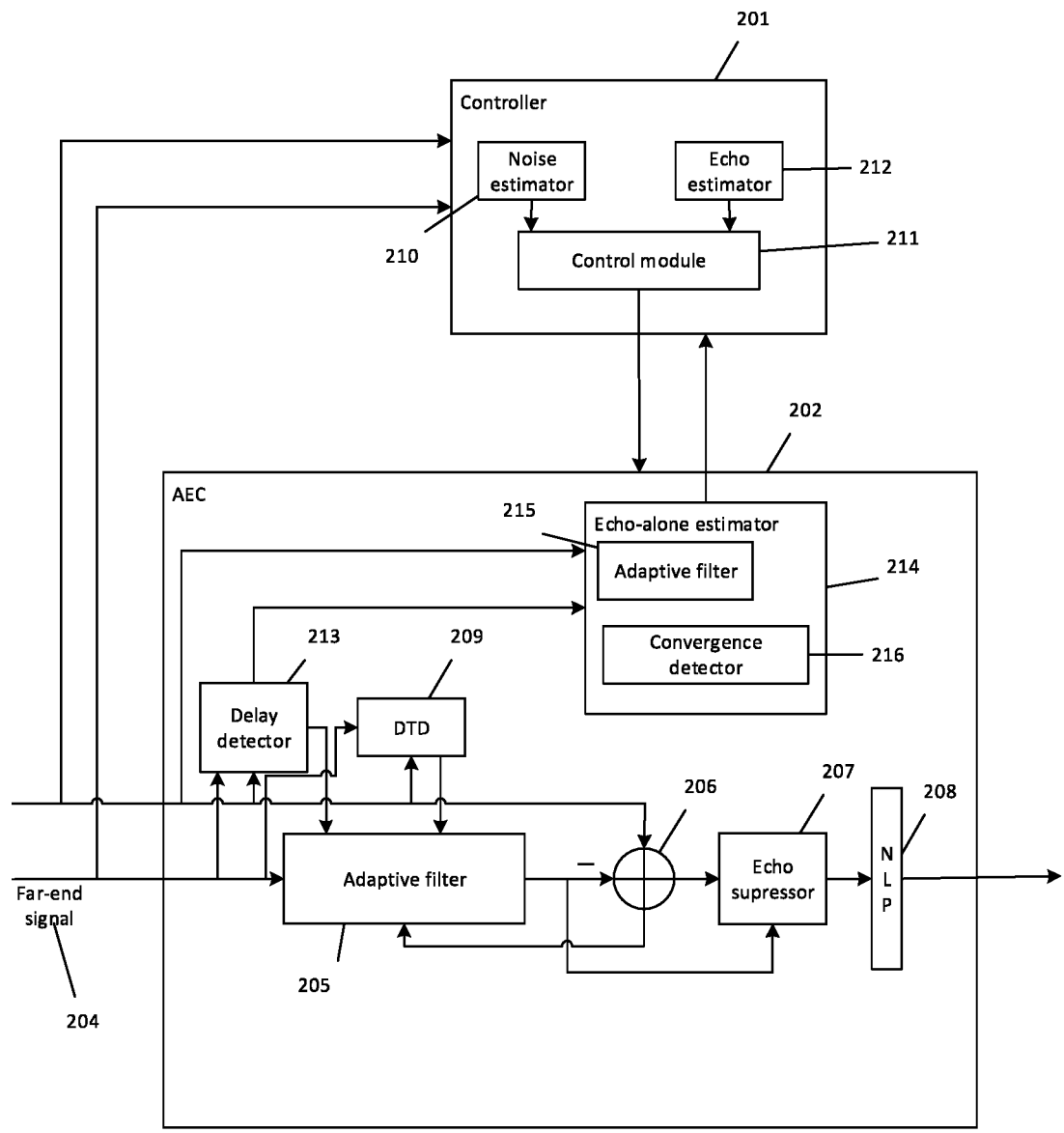
FIG. 2 shows an architecture of an acoustic echo canceller and associated controller.

An example of a controller for an acoustic echo canceller (AEC) is shown in FIG. 2. The controller is shown generally at 201. It is configured to control one or more operational characteristics of the AEC, shown generally at 202.

The AEC 202 is configured to receive a first input signal 203 from a microphone. It is also configured to receive a second input signal 204 from a far-end. In general terms, the AEC 202 is configured to process the signal from the far-end to generate an estimated echo signal. The echo estimate is generated by adaptive filter 205, which effectively attempts to synthesise the real-world acoustic path between a loudspeaker (which outputs the far-end signal) and a microphone (which receives the echo of the far-end signal). The real-world echo is thus one of the possible signal components of the microphone signal 2003.

The microphone will often detect other sound, in addition to the echo. This other sound can generally be considered to fall into two categories: wanted and unwanted. Wanted sound is intentionally transmitted to the far-end. It forms a necessary part of the communication between near-end and far-end users of the system. It is generally referred to as "near-end speech" herein but it could encompass sounds other than human speech. The unwanted sounds are referred to as "noise" herein. This term encompasses the inevitable background noise in the microphone's environment (i.e. ambient noise). These sounds do not form a necessary part of the communication between near-end and far-end users of the system. Sometimes they may actually be detrimental to communication between the users, and usually communication between users is not impaired by the absence of unwanted noise components.

The AEC 202 comprises a subtraction unit 206 configured to subtract the estimated echo from the microphone signal 203. Assuming the estimate is relatively accurate, this provides a substantially echo-free signal for transmission to the far-end. In an echo-alone region there is no wanted sound in the microphone signal, i.e. the microphone signal can be considered to include only the echo from the far-end and some unwanted sound such as noise. In an echo-alone region, any signal remaining after the subtraction is assumed to represent an error in the synthesised echo, and it is fed back to the adaptive filter 205 to update its model of the acoustic echo path.

The AEC shown in FIG. 2 also comprises an echo suppressor 207, a non-linear processor 208 and a double-talk detector 209. The double-talk detector 209 detects the presence of near-end speech (also known as "double-talk"). Sometimes near-end speech may be present together with an echo of far-end speech and background noise and at other times it may be present just with background noise. It is preferably configured to cause adaptation of the adaptive filter 205 on the basis of far-end speech to be stopped when near-end speech is detected because the near-end speech will cause errors in the echo estimation process for estimating the echo in the microphone signal. The echo suppressor 207 and non-linear processor 208 are configured to deal with any residual echo or noise, after the estimated echo has been subtracted from the microphone signal. The residual echo can be quite strong. For example, if the echo path changes dramatically during a period of near-end speech, tracking of the echo path changes by the adaptation filter 205 may be inhibited by the double-talk detector, potentially leading to a strong residual echo. The echo suppressor 207 attenuates the residual echo in dependence on the estimated echo. The non-linear processor 208 removes any remaining residual error by clipping. It often achieves this by simply reducing its gain to zero when its input falls below a time-varying threshold. A typical AEC might also include a comfort noise generator (not shown in the figure) configured to insert comfort noise during periods of clipping to avoid disconcerting periods of silence.

Two key factors that can affect the performance of the AEC are ambient noise in the microphone signal and how strongly the far-end signal is included in the microphone signal 203. These factors can be beneficially used to control the AEC. This requires some indication of the level of various signal components to be determined. Determining the level of a particular signal component will typically involve determining its position on some scale of amount, quantity, quality etc. This scale could be any measure that can be used to assess a signal, including amplitude, magnitude, power, energy, signal strength etc. Some specific measures are given below, such as echo-to-noise ratio and echo return loss. These are examples only, and it should be understood that any suitable measure might be used.

Ambient noise is usually present in the microphone signal 203, even during echo-alone regions of the microphone signal. The error signal that is fed back to the adaptive filter 205 from the subtractor 206 during an echo-alone region thus inevitably includes some ambient noise. This can have the result of causing the adaptive filter 205 to change its model of the acoustic echo path incorrectly; the filter may adapt its filter coefficients based largely on ambient noise rather than any error in its echo estimation. To avoid this, controller 201 includes a noise estimator 210, which is configured to estimate the noise level comprised in the microphone signal, and a control module 211, which is configured to use this estimated noise level to control the AEC 202 to operate effectively to remove echo from the microphone signal.

One possibility is to use the estimated noise level to control the AEC 202 directly. For example, the estimated noise level could be used to control the adaptive step-size of filter 205 so that the filter adapts less quickly when noise is at a high level. Similarly the adaptive filter may be controlled to adapt more quickly when echo strength is high. However, in some cases this might not be the optimal thing to do. For example, when the echo is embedded in noise (i.e. strength of the echo is near to or lower than the noise floor) it may not be appropriate to adapt the filter quickly, even if the echo strength is relatively high. The speed at which the filter adapts is preferably reduced for an echo embedded in noise compared to the speed that is appropriate for the same echo strength but with little noise to avoid the filter adapting quickly to the noise rather than the echo. In a preferred implementation, the control module is configured to control AEC 202 in dependence not only on the level of ambient noise in the microphone signal but on the level of noise relative to the echo component. One option for estimating the level of noise relative to the echo component in the microphone signal is to calculate the echo-to-noise ratio (ENR), which is described in more detail below.

A high echo level can lead to non-linearity and variation in the so-called echo return loss (ERL) based on the signal strength of the far-end signal. Conversely, if the echo strength is low, any correlation-based double-talk detectors or non-linear processors may not work as expected due to low correlation between the echo and the far-end signal. In one implementation, therefore, the controller is configured to control AEC 202 in dependence on the strength of the echo. In FIG. 2, controller 201 comprises echo estimator 212, which is configured to determine some indication of the level of the echo component in the microphone signal. One option for estimating the level of the echo component is to calculate the echo return loss (ERL), which is described in more detail below. The echo estimator is configured to feed the indication to the control module 211, which is configured to control the AEC in dependence on it.

The controller 201 (and more specifically control module 211) is preferably configured to control one or more operational characteristics of the acoustic echo canceller 202. These operational characteristics determine how the AEC 202 models the echo path and cancels the echo—and thus how effective it is at removing echo from the microphone signal. Often they will relate to a specific one of the functional blocks in the AEC. For example, the control module may control one or more of: the adaptive step size of adaptive filter 205, the threshold applied by non-linear processor 208, and the particular mechanism used by double-talk detector 209 to detect near-end speech.

In most implementations the controller will form part of a communication device, such as a mobile phone, smart phone, line connected phone, laptop, tablet, teleconferencing equipment etc. A typical communication device includes a loudspeaker for outputting the far-end signal, a microphone for detecting the near-end signal, a CPU, memory, signal processing circuitry, such as a DSP and filters, etc.

The structures shown in FIG. 2 (and indeed all the block apparatus diagrams included herein) are intended to correspond to a number of functional blocks. This is for illustrative purposes only. FIG. 2 is not intended to define a strict division between different parts of hardware on a chip or between different programs, procedures or functions in software. In some embodiments, some or all of the algorithms described herein may be performed wholly or partly in hardware. In many implementations, at least part of the controller may be implemented by a processor acting under software control (e.g. the CPU or DSP of a communication device). Any such software is preferably stored on a non-transient computer readable medium, such as a memory (RAM, cache, hard disk etc) or other storage means (USB stick, CD, disk etc).

Figure 3:
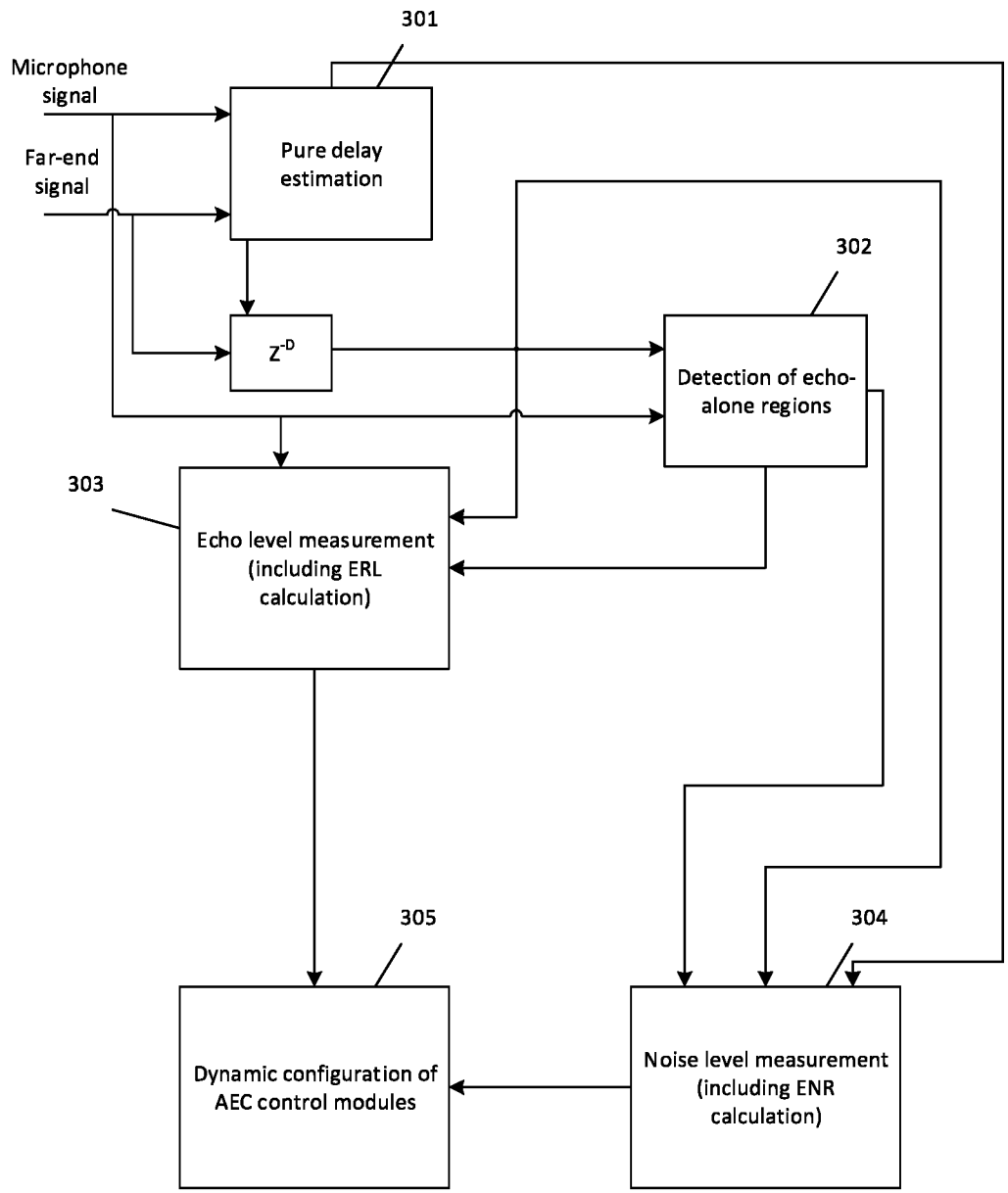
FIG. 3 shows an overview of a process for controlling an acoustic echo canceller.

An overview of a process for controlling an AEC is shown in FIG. 3. The figure represents the process as a series of functional blocks: pure delay estimation 301, detection of echo alone regions 302, ERL and ENR measurement (303 and 304 respectively) and dynamic configuration of AEC 305. Each of these steps is described in more detail below with respect to a specific way of carrying out that step. It should be understood that these are examples only and that different approaches might also be employed.

Delay Estimation

Figure 4:
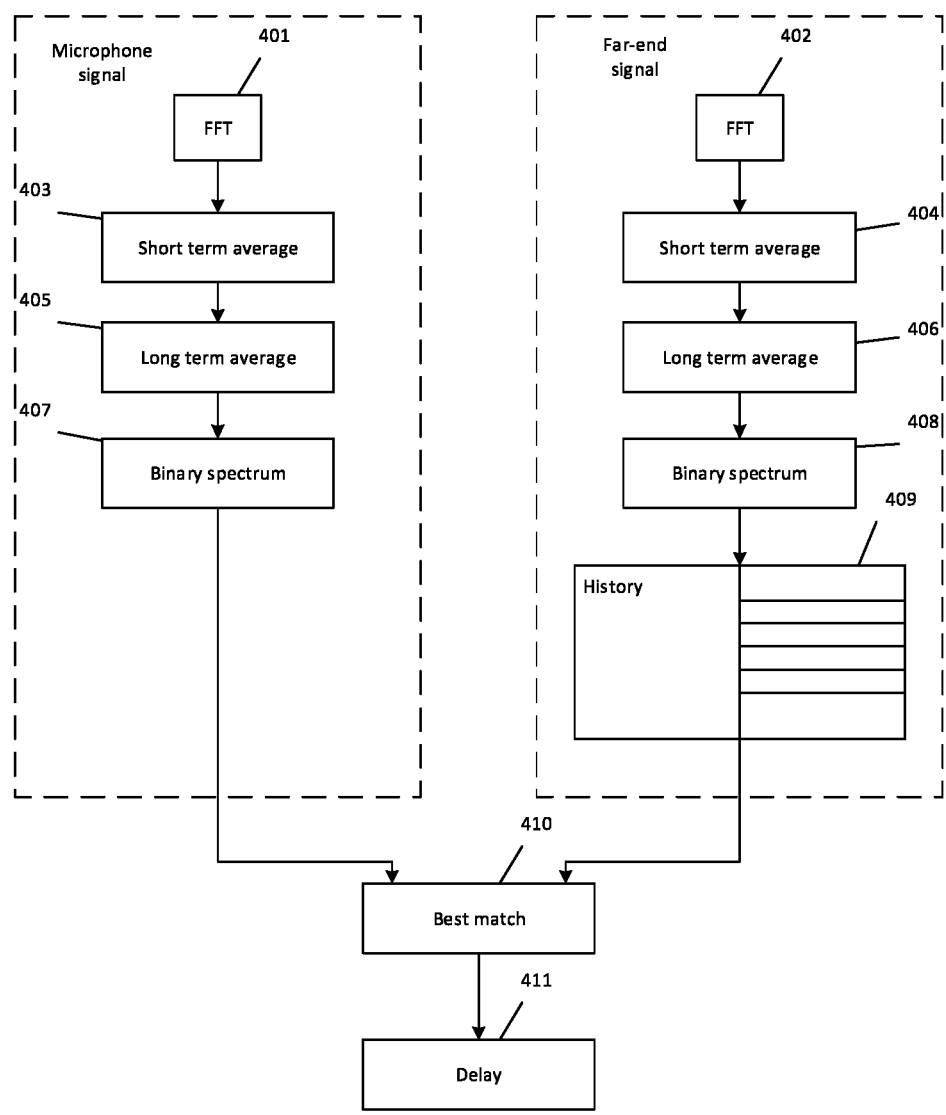
FIG. 4 shows an overview of a process for estimating a delay.

There is an inherent time lapse between a far-end signal being outputted by a loudspeaker and a component of that signal being received as an echo by the microphone. An overview of a process for determining the delay between a microphone signal and a far-end signal is shown in FIG. 4.

In steps 401 and 402 the microphone signal and the far-end signal are converted to the frequency domain. This may be done on a frame-by-frame basis. Suitably a 64 point fast Fourier transform (FFT) is used. A short term average and long term average for every frequency bin is then calculated (steps 403 to 406). A so-called "binary spectrum" is estimated using the short term and long term averages (steps 407 and 408). This process represents each frequency bin in the FFT binary as either a "one" or a "zero". One way of achieving this is for a frequency bin to be set at one if the short term average for a particular frequency bin exceeds long term average of that bin by a predefined threshold T1 and otherwise for that frequency bin to be set at zero.

To trace the echo path delay, a history of binary spectrums for the far-end is kept (step 409). This history can be used to find the delay that gives the best match between the binary spectrum of the microphone signal and the far-end signal (step 410). A suitable history might, for example, encompass the past 50 frames. In one implementation the best match between the two binary spectra may be found by applying an AND operation to the microphone binary spectrum and each far-end binary spectrum in the history and summing the resultants obtained. The frame of the far-end signal that generates the binary spectrum corresponding to highest sum may be considered to be the best match. Once the far-end frame that is the best match to a given near-end frame has been identified, the delay between the far-end signal and the microphone signal can be estimated from the frame number and frame size (step 411).

The estimated delay is preferably used to compensate for the time difference between a particular frame of the far-end signal being outputted by the loudspeaker and a version of that frame being received by the microphone. This helps to ensure that the corresponding frames of the microphone signal and the far-end signal are compared together at later stages in the process. Delay estimation could be performed by the controller but is more likely to be performed by the AEC, since the delay estimation is used by many functional blocks in the AEC. A delay detector is shown at 213 in FIG. 2.

Detection of an Echo Alone Region

Figure 5:
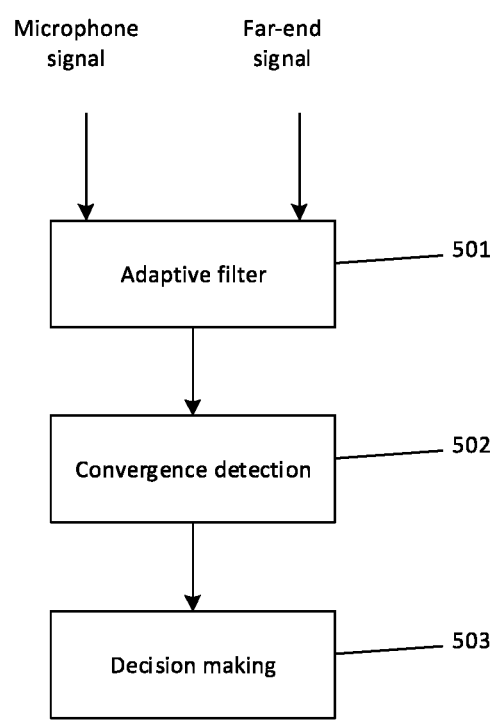
FIG. 5 shows an overview of a process for detecting an echo-alone region.

One possible mechanism for detecting an "echo-alone" region in the microphone signal is shown in FIG. 5. The far-end and microphone signals are suitably fed into an adaptive filter (step 501). The adaptive filter quickly synthesises an estimate of the echo component. The far-end and microphone signals that are input into the filter have suitably already been compensated for the delay between them (as described above), so a relatively short filter is sufficient to generate a quick, relatively accurate estimated signal. In one implementation the adaptive filter may be a short filter, e.g. having a length of around 20 ms. Suitably the filter is operated in continuous adaptive mode, so its coefficients are never frozen. In FIG. 2 the adaptive filter is shown at 215. It forms part of an echo-alone estimator 214 comprised in AEC 202. In other examples, the echo-alone estimator 214 might form part of the controller 201.

After processing every frame, the convergence of the short filter is estimated (step 502). This step may be performed by convergence detector 216, which forms part of echo-alone estimator 214. One way of achieving this is to project the echo estimate ŷ onto the microphone signal m. The convergence factor $P_{ym}$ for the $k^{th}$ frame comprising a number of samples N may be given by:

$$P_{ym}(k) = \frac{1}{N}\sum_{i=0}^{N-1} \frac{|\hat{y}(i)| \cdot |m(i)|}{|m(i).m(i)|} \quad (1)$$

$P_{ym}(k)$ is compared to a threshold to determine whether the microphone signal incorporates near-end speech or not. If $P_{ym}(k)$ is close to unity, it typically indicates that current frame of microphone signal contains only echo. If $P_{ym}(k)$ is not close to unity, it typically indicates that the microphone signal incorporates near-end speech and/or ambient background noise. A suitable threshold for making the distinction between near-end speech being present or not is 0.6 or lower. The functionality of echo estimator 214 depends on the accurate discrimination of echo-alone regions in the microphone signal. For example, spurious detection of near-end speech as an echo-alone region could lead to the echo being wrongly estimated. A delay detecting an echo-alone region or erroneously detecting an echo-alone region as being a period of near-end speech will lead to delay in estimation of an echo-alone region, but it does not typically impact the accuracy of the estimation.

Echo Level Estimation

An indication of the level of the echo component in the microphone signal can be found in a number of ways. One suitable mechanism is to measure the loss/gain of the original far-end signal in the echo component of the microphone signal. This is known as echo return loss, or ERL, which represents the amount of echo loss in the acoustic echo path between the loudspeaker and the microphone in decibels. A high, positive ERL indicates a large loss of the original far-end signal in the echo. This corresponds to a relatively small echo. A negative ERL indicates the echo displays some gain with respect to the original signal. This corresponds to a relatively large echo.

Figure 6:
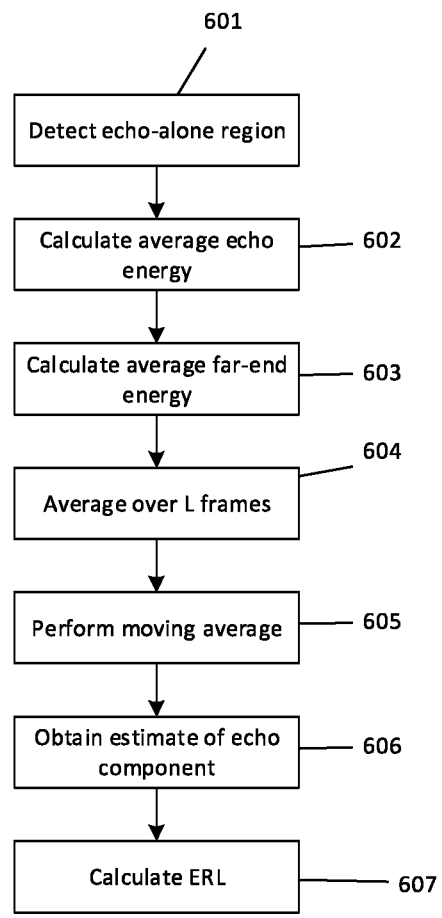
FIG. 6 shows an overview of a process for calculating an echo return loss.

FIG. 6 illustrates an example of a mechanism for determining an ERL measurement. In this example an echo-alone region of the microphone signal and an estimated noise floor energy are used to estimate the echo level. The reason for including the noise floor into the calculation is that the echo component of the microphone signal is not directly available, since the microphone signal incorporates ambient background noise.

The process commences in step 601 with detecting an echo-alone region in the microphone signal. The echo signal energy of $l^{th}$ echo-alone frame, $E_m(l)$ and the averaged power, $E_{ma}(l)$ are then computed as given below (step 602):

$$E_m(l) = \sum_{i=0}^{N-1} m(i)^2 \quad (2)$$

$$E_{ma}(l) = \alpha_1 E_{ma}(l+1) + (1-\alpha_1)E_m(l) \quad (3)$$

wherein m(i) is sample i of the $i^{th}$ echo-alone frame of the microphone signal, where there are N samples in each frame, and wherein $\alpha_1$ is an averaging factor which may be tuned accordingly to suit a particular implementation.

Similarly, delay compensated far-end signal energy $E_f(l)$ and corresponding averaged power, $E_{fa}(l)$ are computed for the $i^{th}$ frame are computed as given below (step 603):

$$E_f(l) = \sum_{i=0}^{N-1} x(i)^2 \quad (4)$$

$$E_{mf}(l) = \alpha_1 E_{fa}(l-1) + (1-\alpha)E_f(1) \quad (5)$$

wherein x(i) is sample i of the $l^{th}$ delay-compensated frame of the far-end signal, where there are N samples in each frame, and wherein $\alpha_1$ is an averaging factor which may be tuned accordingly to suit a particular implementation.

Preferably the energy input into the ERL estimation is averaged energy over the past L frames (step 604). This is to compensate for any saturation or data-dependent talk spurts that might otherwise have an impact on the estimation. The value of L is suitably chosen to cover an average talk spurt duration.

$$E_{mp}(l) = \frac{1}{L}\sum_{\delta=0}^{L-1}(E_{ma}(l-\delta)) \quad (6)$$

$$E_{fp}(l) = \frac{1}{L}\sum_{\delta=0}^{L-1}(E_{fa}(l-\delta)) \quad (7)$$

A moving average may then be performed to obtain a smoothened estimate of the far-end and microphone signal energies (step 605).

$$E_{fpa}(l) = \alpha_2(l)E_{fpa}(l-1) + (1-\alpha_2(l))E_{fp}(l) \quad (8)$$

$$E_{mpa}(l) = \alpha_3(l)E_{mpa}(l-1) + (1-\alpha_3(l))E_{mp}(l) \quad (9)$$

The value of averaging factors $\alpha_2(l)$ and $\alpha_3(l)$ can be selected in dependence on the difference between a respective average and its corresponding smoothened energy. The smoothened energies are typically obtained over many more frames than the average energies. If the average energy is greater than the smoothened energy, this may indicate that the moving average should track changes in the average more quickly, e.g. by being adjusted to take greater account of the most recent average. A suitable averaging factor in this instance might be 0.875. If the average energy is greater than the smoothened energy, this may indicate that the adjustment should be weighted towards the longer-term average. A suitable averaging factor in this instance might be 0.9980. This dual-valued parameter approach is used throughout the examples of signal level estimation that are described herein.

An example of how to estimate the noise floor of the microphone signal is described below (see equation 16). The estimated noise floor may be subtracted from the smoothened microphone signal energy $E_{mpa}(l)$ to obtain an estimate of just the echo component of the microphone signal (step 606).

$$E_{mea}(l) = E_{mpa}(l) - E_{na}(l) \tag{10}$$

The smoothened energies may then be converted into decibels:

$$E_{ml}(l) = 10 \log_{10}[E_{mea}(l)] \tag{11}$$

$$E_{fl}(l) = 10 \log_{10}[E_{fpa}(l)] \tag{12}$$

The estimated energy levels for the echo component and the far-end signal can be used to calculate the ERL. The ERL can be calculated by subtracting the smoothened echo power in decibels from smoothened far-end power (step 607).

$$ERL(l) = E_{fl}(l) - E_{ml}(l) \tag{13}$$

The measurement of ERL is preferably only done during echo-alone regions. Preferably some filtering is performed to lessen the impact of any near-end talk spurts mis-detected as echo alone regions. ERL measurements may therefore be averaged to compensate for any spurious detection of near-end speech as an echo-alone region (step 608).

$$ERL_a(l) = \alpha_4(l) ERL_a(l-1) + (1 - \alpha_4(l)) ERL(l) \tag{14}$$

Once again $\alpha_4(l)$ may be dual-valued. The value of $\alpha_4(l)$ may depend on whether $ERL(l)$ is greater than $ERL_a(l)$ or vice-versa. In the first case, a suitable value for $\alpha_4(l)$ may be 0.9980. For the second case, a suitable value for $\alpha_4(l)$ may be 0.875.

Noise Level Estimation

An indication of the impact that noise level in the microphone signal is likely to have on the adaptive filter can be found in a number of ways. One way is to measure the ratio of echo level to noise level in the microphone signal. It is possible to consider the noise level alone, but including a measure of how strong the noise is relative to the echo component may be advantageous because it incorporates an indication of how problematic the noise is likely to be in practice into the control mechanism.

Figure 7:
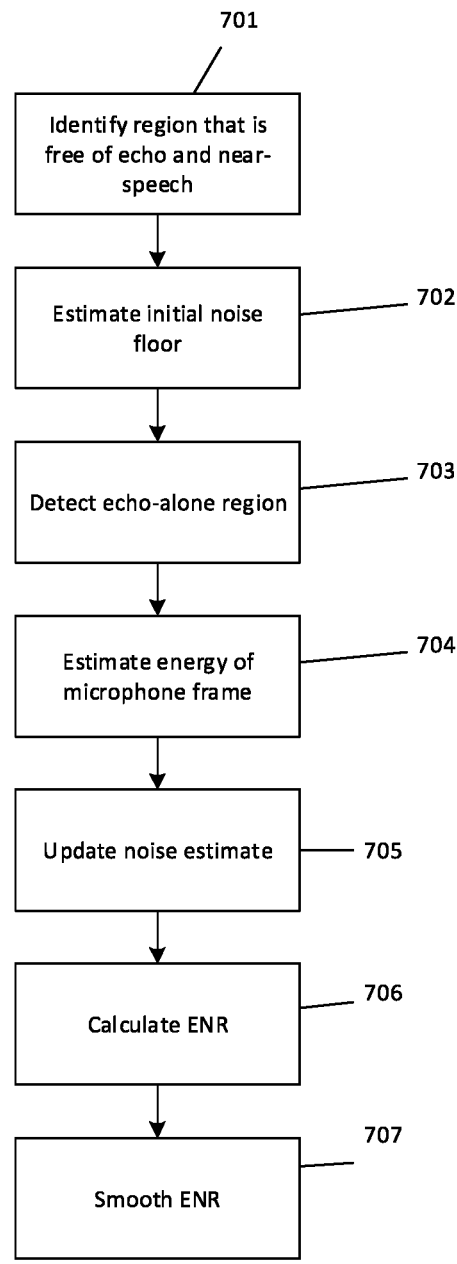
FIG. 7 shows an overview of a process for calculating an echo-to-noise ratio.

An example of a process for estimating a noise level of the microphone signal is shown in FIG. 7.

The noise estimation process is preferably initiated during a period with no echo (step 701). This can be achieved by taking advantage of the natural delay between transmitting the first frame of a period of far-end speech and receiving an echo of that frame. In the intervening period (assuming there is no near-end speech), the microphone signal should just comprise ambient noise. This provides an estimate of the noise floor to initiate the process (step 702).

The signal level of the microphone signal for the $k^{th}$ frame is given by the following equation:

$$E_m(k) = \Sigma_{i=0}^{N-1} m(i)^2 \tag{15}$$

This equation can be used to obtain an initial estimate of the noise floor before any echo is received. For later frames the energy of the microphone signal no longer simply contains noise since it is likely to also incorporate some degree of echo. It is usually not practical to separate the ambient noise from the echo, so the noise estimation process may continue to estimate the level of each subsequent frame of the microphone signal and take this as a proxy for the noise. Suitably the noise level is only estimated during echo-alone regions of the microphone signal (step 703). The noise level of each subsequent frame can be estimated using the same process as in equation 15 above (step 704). Preferably only a very small amount of the energy of each subsequent frame of the microphone signal is added to an ongoing noise level estimate (as is outlined below).

The noise floor can be estimated by an averaging filter tracking the minimum statistics of energy. $E_{na}(k)$ gives the noise floor level for the $k^{th}$ frame. It is updated as given below (step 705):

$$E_{na}(k) = \alpha_5(k) E_{na}(k-1) + (1 - \alpha_5(k)) E_m(k) \tag{16}$$

$\alpha_5(k)$ is suitably dual-valued. It may be selected from a set of two or more values depending on whether the average noise floor estimation $E_{na}(k-1)$ is greater than the current frame microphone signal level or vice versa. In the first case a suitable value might be around 0.8 to track to the noise floor very quickly. In the second case a suitable value might be 0.9999 to maintain the noise floor. Thus only a very small amount of the energy estimated for the current frame is incorporated in the new noise level estimate unless the indication is that the noise floor is currently over-valued, in which case the noise estimate is forced to quickly track lower.

With the noise floor computed, it is suitably converted to decibels, together with the corresponding frame of the microphone signal. For the $l^{th}$ frame:

$$E_{nl}(l) = 10 \log_{10}[E_{na}(l)] \tag{17}$$

$$E_{ml}(l) = 10 \log_{10}[E_m(l)] \tag{18}$$

The ENR value can then be calculated as follows (step 706):

$$ENR(l) = E_{ml}(l) - E_{nl}(l) \tag{19}$$

The ENR value is thus calculated using the microphone signal rather than the echo component per se. Another option would be to separate out the echo component from the microphone signal by subtracting the current noise estimate from the estimated energy for the current microphone frame prior to the decibel conversion, in a similar way to equation 10. Comparing the current noise estimate with the microphone signal provides a convenient shortcut. Estimating the echo component simply comprises subtracting the current noise estimate from the microphone signal. Therefore, in terms of the information that is provided about the level of noise in the microphone signal compared with the echo component, it is effectively the same to compare the noise level to the microphone signal as it is to compare the noise level with the echo component comprised in the microphone signal. That is because the only difference between the microphone signal and the echo component is the noise level, and it is the noise level that the microphone signal/echo component is being compared with in the comparison operation. While the actual numerical value output by the two comparison operations will be different, the information represented by those numerical values will be the same. It is just the threshold at which the numerical value can be categorised into representing a noise level having a particular effect on the adaptive filter that changes.

The technique described above provides a particularly convenient threshold. If the echo component is negligible, the microphone signal will be predominantly noise. Consequently the output of equation 19 will be close to, or less than, zero. This suggests that the adaptive filter should be adapted more slowly because noise will be more noticeable. If the echo component is larger, the microphone signal will have a higher energy than the noise. The output of equation 19 will be above zero. In this case the adaptive filter should be adapted more quickly because the noise is likely to be less problematic. A practical application of this principle is demonstrated by table 1, below, which sets out suitable values for the adaptive factor depending on the ENR.

The obtained ENR value may be smoothed using a dual-valued parameter similar to the one used in the ERL average computation described above (step 707):

$$ENR_a(l)=\alpha_6(l)ENR_a(l-1)+(1-\alpha_6(l))ENR(l)$$

$\alpha_6(l)$ is suitably dual-valued and can be one of two or more different values depending on whether ENR(l) is greater than the average ENR or vice-versa. In the first case it is around 0.9980; in the second case it is 0.875. These values are chosen to smoothen out the influence of peak values of measurements.

Tuning of Control Parameters

The controller 201 is preferably configured to control one or more operational characteristics of the acoustic echo canceller in dependence on one or more of the signal levels described above. The characteristics that are controlled will typically include one or more of: an adaptation factor of the adaptive filter, a threshold of the non-linear processor and a configuration of the double-talk detector.

The adaptation factor determines how rapidly the adaptive filter responds to changes in the acoustic echo path. It controls how the filter's weights are changed in response an error in the estimated echo. The adaptation factor is denoted $\Delta$. Its role in updating filter weights, $W_i$, of the adaptive filter can be expressed as follows:

$$W_i(n+1) = W_i(n) + \Delta * \frac{e(n)x(n)}{\|x(n)\|^2} \quad (20)$$

e(n) is the error signal, which is fed-back to the adaptive filter.

x(n) is the far-end signal, delay compensated to correspond to the error signal.

The adaptation factor may be selected in dependence on the level of noise in the microphone signal, and in particular in dependence on the noise level relative to the echo component (e.g. the ENR). The level of noise relative to echo gives an indication of how noticeable the noise is likely to be and how much impact it will have on echo cancellation. Dynamically adapting the step-size in filter weight adjustment to the relative noise level helps to achieve a more optimal performance.

The non-linear processor and double-talk detector can also benefit from being controlled in dependence on the appropriate signal levels. Under very high negative ERL (e.g. less than −6 dB) or high positive ERL (e.g. higher than 18 dB), echo cancellation achieved by the adaptive filter may not be good enough for correct functioning of non-linear processors or double-talk detectors that are based on principles of correlation and/or convergence. This is because a high negative ERL can lead to non-linearity, with different frequencies of the far-end signal experiencing a different ERL. It can also lead to variation in the ERL depending on the signal strength of the far-end signal. Under a high positive ERL, correlation-based double-talk detectors and non-linear processors may not work as expected due to low correlation between the very small echo and the far-end signal. This can lead to low echo cancellation and to noise dominating the echo. Hence, the form of double-talk detection that is employed may need to be dynamically configured away from convergence-based methods for both high negative ERL and positive ERL cases. Geigel-based methods may be more appropriate in these scenarios. Non-linear processor thresholds may also need to be updated.

The various signal levels described herein mainly depend on objects present in the echo/audio path of a specific real-world deployment and platform-specific factors, such as sensitivity of the microphone, gain of the power amplifier or speaker, acoustic coupling between microphone and speaker, quantization/de-quantization performance of an ADC/DAC, etc. In conventional systems, platform-specific tuning and/or environment-specific tuning would have to be performed to achieve optimal echo cancellation based on these factors. The mechanisms described herein avoid this by providing dynamic, automatic control of the relevant AEC parameters and characteristics.

In some situations the ENR and the ERL have a synergistic effect that means it may be beneficial for the controller to consider both when determining how to control the AEC. For example, when the ERL is very high, the echo strength is low. In this scenario background noise can become more noticeable. The impact of noise upon the echo cancellation can become severe. Having a low adaptation speed may assist proper echo cancellation. Conversely, if the ERL is negative, the echo is more likely to dominate noise significantly. In this scenario, high adaptation speed may be required for quick convergence or reconvergence of the adaptive filter. Therefore, a specific operational characteristic of the AEC may be set in dependence not only on one signal level, but in dependence on a combined influence that two or more of the signal levels have on the correct operation of the AEC.

The synergistic effect described above is apparent from the following table, which sets out examples of suitable operational characteristics of the AEC under different situations. It can be seen, for example, that while the ENR alone may be used to select from a set of two or more adaptation factors, the ERL may determine the set of adaptation factors from which that selection is made.

TABLE 1

Control of AEC operational characteristics

| ERL | ENR | DTD/NLP tuning | Adaptive factor, $\Delta$ |
|---|---|---|---|
| <−12 dB | ENR > 0<br>ENR <= 0 | DTD and NLP that handles non-linearity with maximum NLP threshold | ¼<br>⅛ |

TABLE 1-continued

Control of AEC operational characteristics

| ERL | ENR | DTD/NLP tuning | Adaptive factor, Δ |
|---|---|---|---|
| −3 dB to −12 dB | No significance | DTD and NLP that handles non-linearity with average NLP threshold | ½ |
| −2 to 10 dB | No significance | DTD and NLP that handles non-linearity with average NLP threshold | 1 |
| 10 to 18 dB | ENR > 0<br>ENR <= 0 | Correlation based DTD with minimum NLP threshold | ½<br>¼ |
| >18 dB | ENR > 0<br>ENR <= 0 | Geigel DTD with NLP threshold chosen in dependence on ENR | ¼<br>⅛ |

The non-linear processor is typically configured to remove any signal energy below a threshold that remains in the microphone signal after the echo canceller has subtracted the echo estimate from it. The threshold therefore determines how much energy the non-linear processor removes from the microphone signal before it is transmitted to the far-end. If the threshold is low, the non-linear processor effectively just removes any remnants of the echo that remain because the adaptive filter has not perfectly modelled the echo path. If the threshold is high, however, the non-linear processor effectively blocks any signal from the near-end. This means that controlling the threshold effectively controls a mode of operation of the communication device. When the threshold is low, the communication device operates in full duplex mode by permitting signals to travel in both directions. When the threshold is high, the communication device operates in half-duplex mode by permitting signals to travel in one direction only (i.e. from the far-end to the near-end).

The threshold for the non-linear processor may usually be chosen in dependence on the ERL, as shown in the table. When the ERL is particularly high, however, the threshold may also be selected in dependence on the ENR. For example, if the ENR is less than or equal to zero, a minimum threshold (e.g. 400) may be employed since the echo is embedded in the noise floor. If the ENR is equal to or greater than zero, an average threshold (e.g. 3400) may be employed since the echo is visible above the noise floor.

Results

ERL Estimation

Figure 8A:
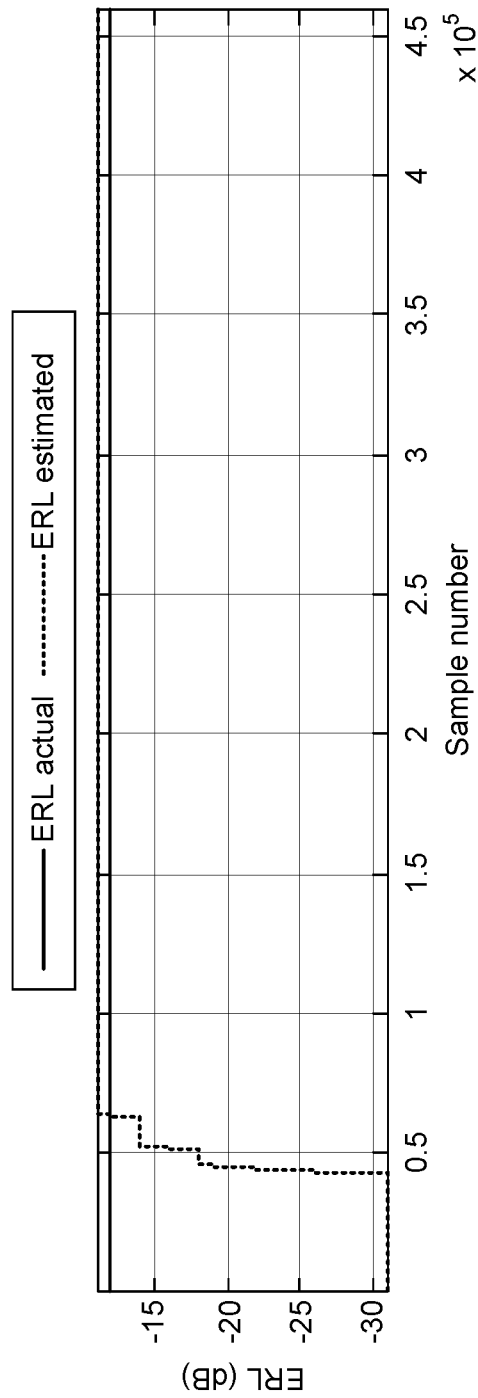
FIGS. 8a and b show an estimated echo return loss tracking an actual value.
Figure 8B:
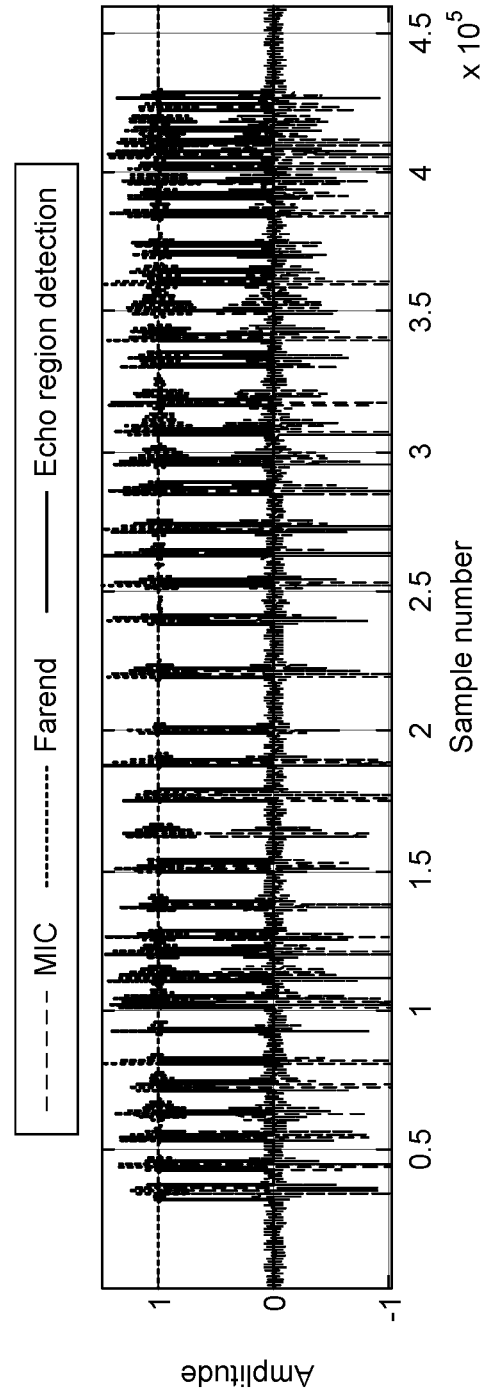

FIGS. 8a and b show the results of a test that used simulated speech signals to validate ERL measurement. A speech signal (far-end reference) was convolved with a room impulse response corresponding to a pre-determined ERL to obtain the microphone signal. These signals were fed to offline dynamic tuning module. Results of two test cases are given here. One test case simulated a negative ERL of −12 dB (shown in FIG. 8a) and the other simulated a positive ERL of 18 dB (shown in FIG. 8b). Near-end speech was added at 80000 samples for the 18 dB ERL echo signal to check the impact of near-end speech on ERL estimation. It is evident from the figures that tracking of the ERL was achieved within 3 seconds of the start of the echo-alone region and was even quite stable during regions of near-end speech.

ENR Estimation

Figure 9A:
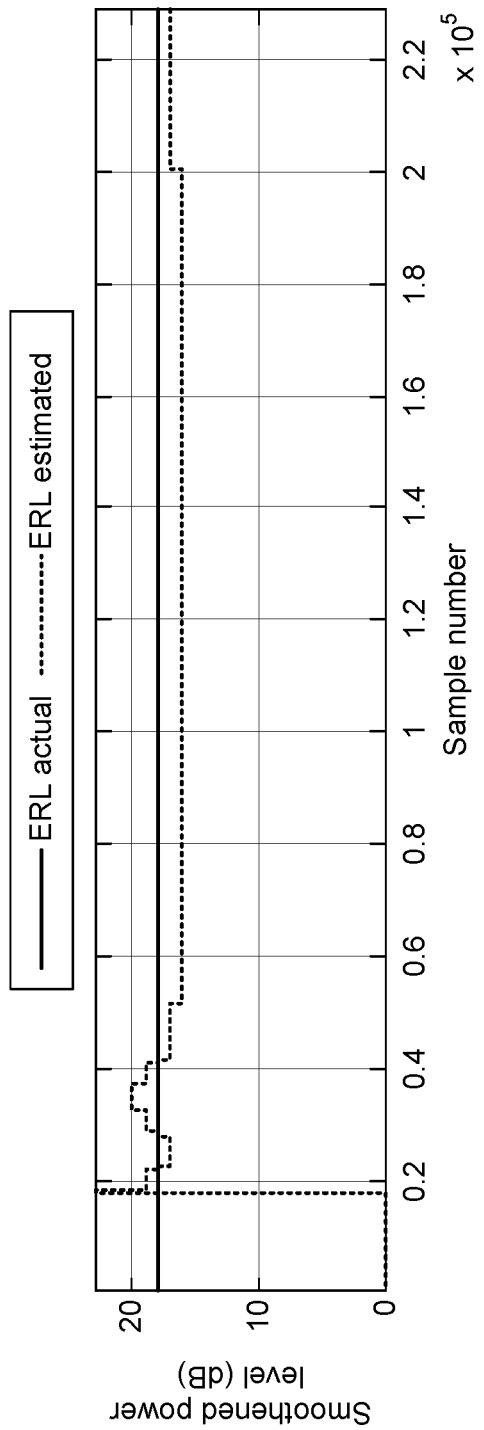
FIGS. 9a and b show an estimated echo return loss tracking an actual value.
Figure 9B:
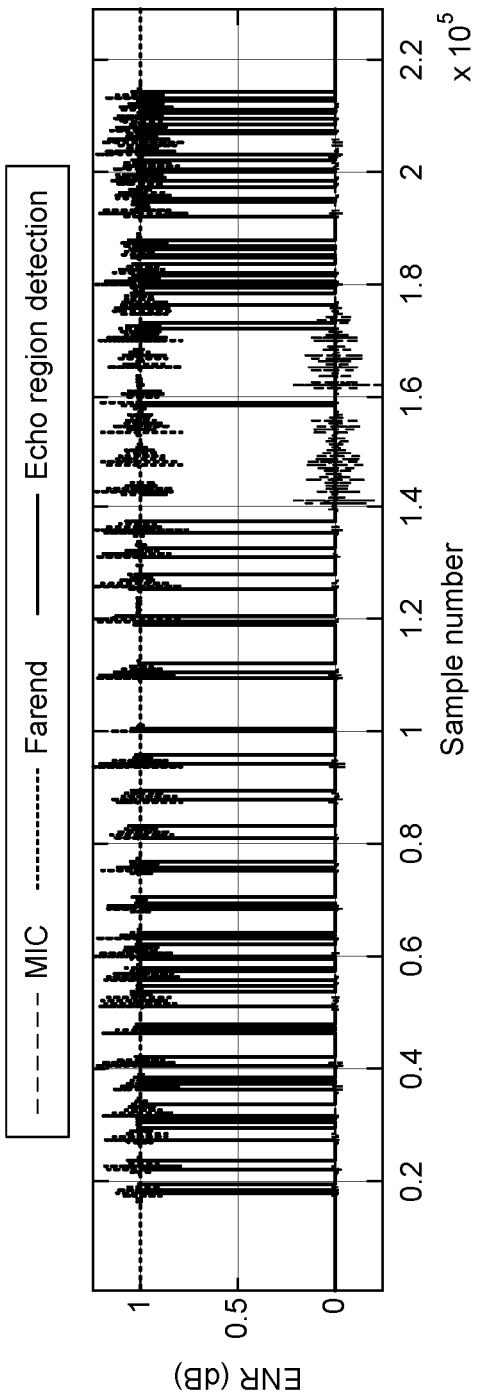

FIG. 9 shows the results of a test that used simulated speech signals to validate ERL measurement. A speech signal was convolved with a room impulse response corresponding to an ERL of 10 dB to obtain the microphone signal. White Gaussian noise was added to the microphone signal at an SNR level of 20 dB. As can be seen from FIG. 9, the noise estimator is able to track the correct noise value and is stable.

AEC Performance

Figure 10A:
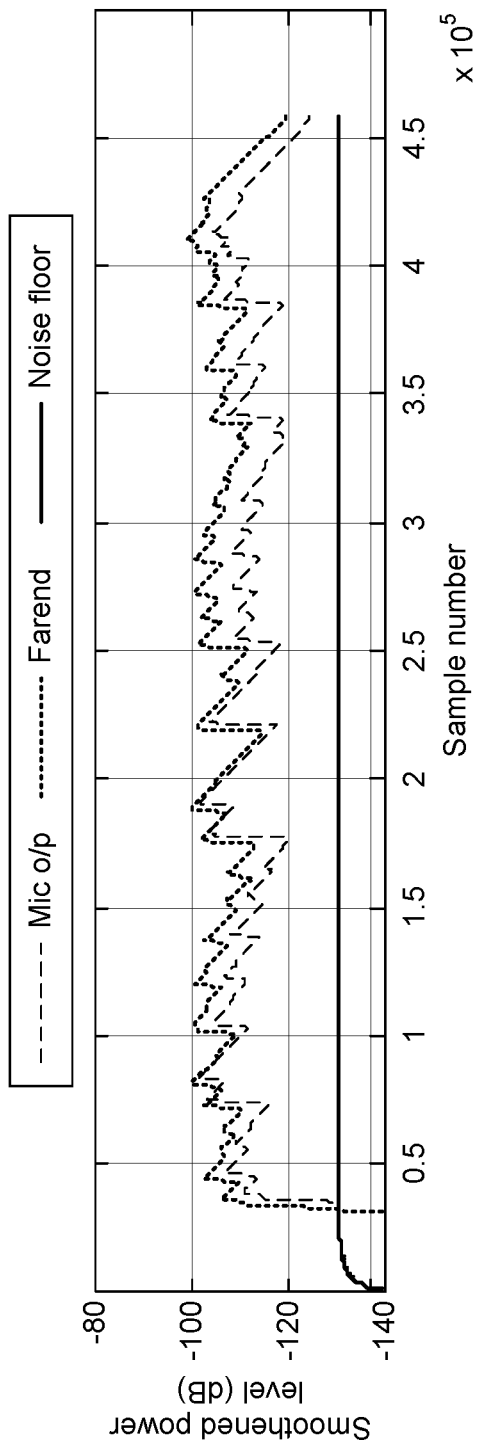
FIGS. 10a and b show an estimated echo-to-noise ratio tracking an actual value.
Figure 10B:
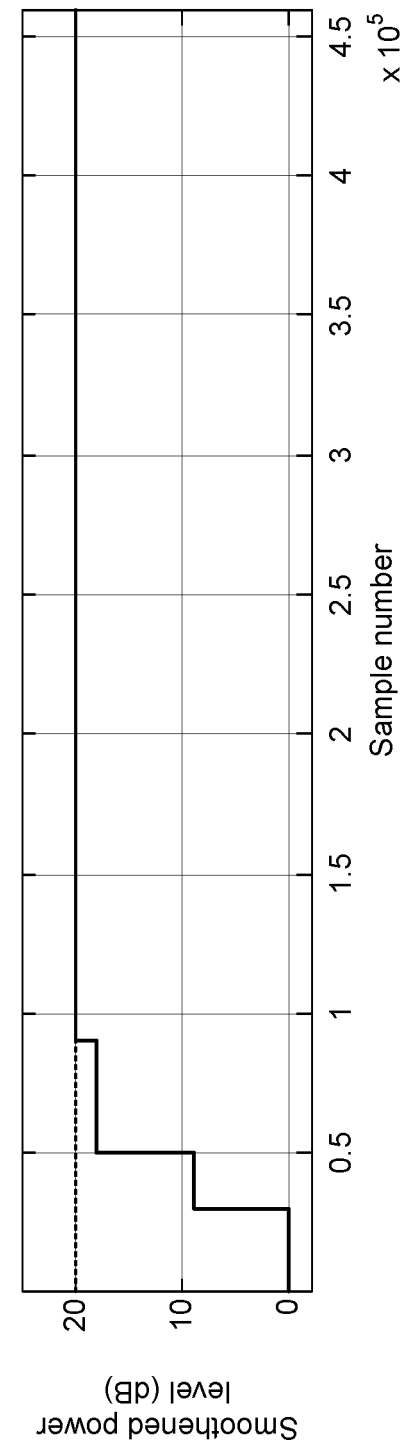
Figure 11:
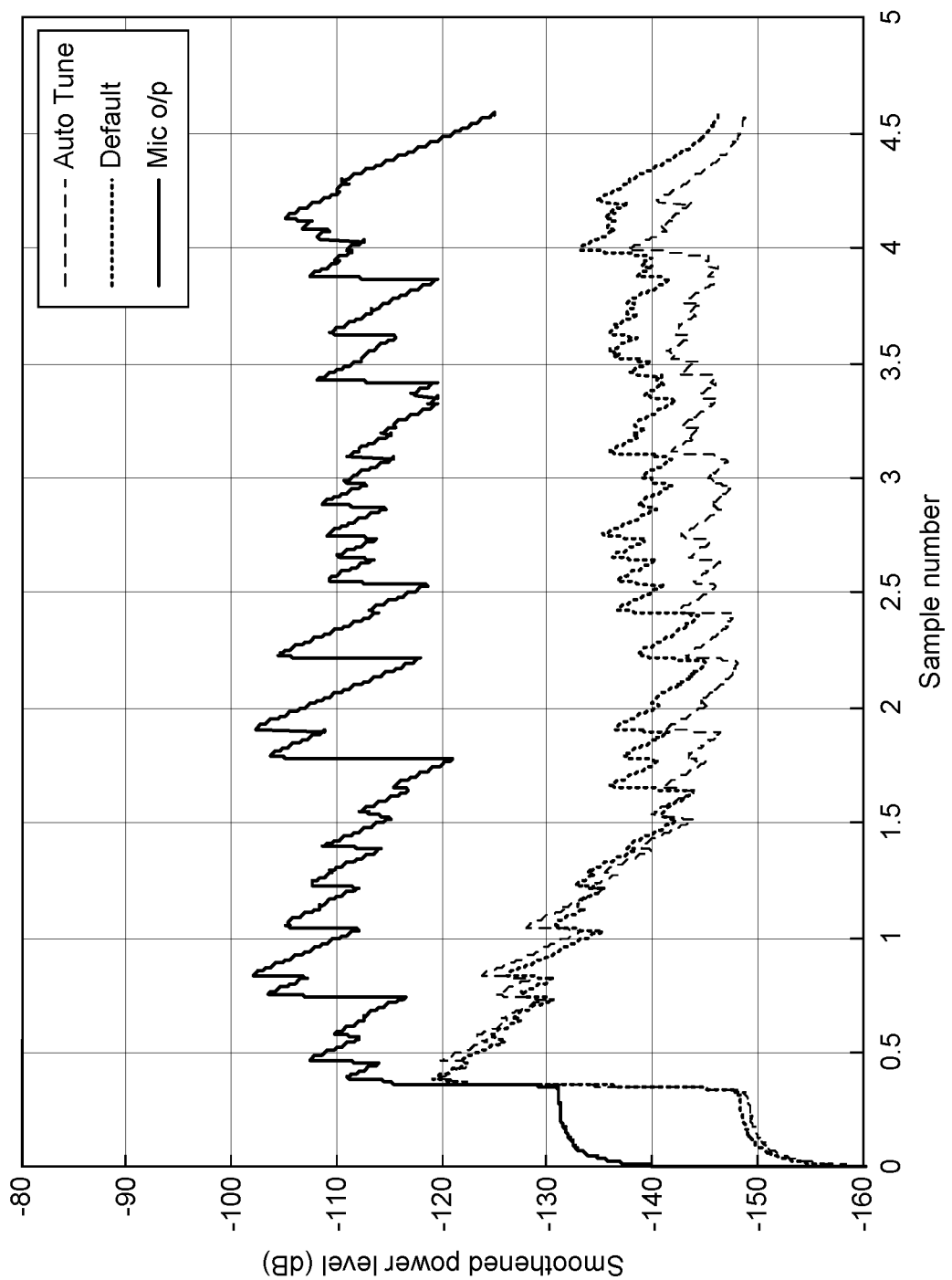
FIG. 11 shows a comparison of adaptive filter outputs.

A speech signal was convolved with a room impulse response corresponding to an ERL of 18 dB and an ENR of 20 dB. FIG. 10 represents the AEC output. to obtain the microphone signal. It is evident from this figure that auto tuning improves the cancellation by close to 8 dB.

Generally, any of the functions, methods, techniques or components described above can be implemented in modules using software, firmware, hardware (e.g., fixed logic circuitry), or any combination of these implementations. The terms "module," "functionality," "component", "block" and "logic" may be used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a non-transitory computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples. Any range or value given herein may be extended or altered without losing the effect sought, as will be apparent to the skilled person. The steps of the methods described herein may be carried out in any suitable order, or simultaneously where appropriate.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A noise estimator for estimating an averaged noise component comprised in a microphone signal, the noise estimator being configured to:
    obtain a first noise estimate for a first frame of the microphone signal which is prior to an echo component becoming part of the microphone signal by estimating a level of the microphone signal during the first frame;
    obtain a second noise estimate for a second frame of the microphone signal in which the echo component does form part of the microphone signal by estimating a level of the microphone signal during the second frame; and
    form an averaged noise estimate for the second frame by performing a weighted sum of the first noise estimate and the second noise estimate.

2. A noise estimator as claimed in claim 1, wherein the echo component is formed from a far-end signal being outputted by a loudspeaker and becoming part of the microphone signal.

3. A noise estimator as claimed in claim 2, wherein the noise estimator is configured to obtain the first noise estimate for the first frame by estimating the level of the microphone signal during a delay between the far-end signal being outputted by the loudspeaker and the echo component formed therefrom becoming part of the microphone signal.

4. A noise estimator as claimed in claim 1, wherein a weight for the first noise estimate is greater than a weight for the second noise estimate in the weighted sum.

5. A noise estimator as claimed in claim 1, the noise estimator being configured to track the level of the averaged noise component across a series of frames of the microphone signal by, for each successive frame in the series:
    forming a current noise estimate by estimating a level of the microphone signal in that respective frame of the series; and
    forming a current averaged noise estimate by performing a weighted sum of the current noise estimate and the averaged noise estimate for the preceding frame in the series.

6. A noise estimator as claimed in claim 5, the noise estimator being configured to select weights of the weighted sum for forming the current averaged noise estimate in dependence on whether or not the averaged noise estimate for the preceding frame is above the current noise estimate.

7. A noise estimator as claimed in claim 5, the noise estimator being configured to select weights of the weighted sum for forming the current averaged noise estimate by:
    comparing the current noise estimate to the averaged noise estimate for the preceding frame; and
    if the averaged noise estimate for the preceding frame is greater than the current noise estimate, forming the current averaged noise estimate by using a larger weight for the current noise estimate than if the averaged noise estimate for the preceding frame is less than the current noise estimate.

8. A method for estimating an averaged noise component comprised in a microphone signal, the method comprising:
    obtaining a first noise estimate for a first frame of the microphone signal which is prior to an echo component becoming part of the microphone signal by estimating a level of the microphone signal during the first frame;
    obtaining a second noise estimate for a second frame of the microphone signal in which the echo component does form part of the microphone signal by estimating a level of the microphone signal during the second frame; and
    forming an averaged noise estimate for the second frame by performing a weighted sum of the first noise estimate and the second noise estimate.

9. A method as claimed in claim 8, wherein the echo component is formed from a far-end signal being outputted by a loudspeaker and becoming part of the microphone signal.

10. A method as claimed in claim 9, comprising obtaining the first noise estimate for the first frame by estimating the level of the microphone signal during a delay between the far-end signal being outputted by the loudspeaker and the echo component formed therefrom becoming part of the microphone signal.

11. A method as claimed in claim 8, wherein a weight for the first noise estimate is greater than a weight for the second noise estimate in the weighted sum.

12. A method as claimed in claim 8, comprising tracking the level of the averaged noise component across a series of frames of the microphone signal by, for each successive frame in the series:
   forming a current noise estimate by estimating a level of the microphone signal in that respective frame of the series; and
   forming a current averaged noise estimate by performing a weighted sum of the current noise estimate and the averaged noise estimate for the preceding frame in the series.

13. A method as claimed in claim 12, comprising selecting weights of the weighted sum for forming the current averaged noise estimate in dependence on whether or not the averaged noise estimate for the preceding frame is above the current noise estimate.

14. A method as claimed in claim 12, comprising selecting weights of the weighted sum for forming the current averaged noise estimate by:
   comparing the current noise estimate to the averaged noise estimate for the preceding frame; and
   if the averaged noise estimate for the preceding frame is greater than the current noise estimate, forming the current averaged noise estimate by using a larger weight for the current noise estimate than if the averaged noise estimate for the preceding frame is less than the current noise estimate.

15. A non-transitory machine readable storage medium having encoded thereon non-transitory machine-readable code implementing a method for estimating an averaged noise component comprised in a microphone signal, the method comprising:
   obtaining a first noise estimate for a first frame of the microphone signal which is prior to an echo component becoming part of the microphone signal by estimating a level of the microphone signal during the first frame;
   obtaining a second noise estimate for a second frame of the microphone signal in which the echo component does form part of the microphone signal by estimating a level of the microphone signal during the second frame; and
   forming an averaged noise estimate for the second frame by performing a weighted sum of the first noise estimate and the second noise estimate.

* * * * *

UNITED STATES PATENT AND TRADEMARK OFFICE
CERTIFICATE OF CORRECTION

Page 1 of 2

PATENT NO. : 10,999,418 B2
APPLICATION NO. : 16/502459
DATED : May 4, 2021
INVENTOR(S) : Mani et al.

It is certified that error appears in the above-identified patent and that said Letters Patent is hereby corrected as shown below:

On the Title Page

In item (30) Foreign Application Priority Data:
"Oct. 30, 2014 (GB) .................1419353"
Should be replaced with:
--Oct. 30, 2014 (GB) .................1419353.6--

In the Specification

In Column 8, Line 12:
"Microphone signal 2003."
Should be replaced with:
--Microphone signal 203.--

In Column 12, Lines 30-31, formula (3):
"$E_{ma}(l) = \alpha_1 E_{ma}(l+1) + (1-\alpha_1) E_m(l)$"
Should be replaced with:
--$E_{ma}(l) = \alpha_1 E_{ma}(l-1) + (1-\alpha_1) E_m(l)$--

In Column 12, Line 33:
"$i^{th}$"
Should be replaced with:
--$l^{th}$--

In Column 12, Line 38:
"$i^{th}$"
Should be replaced with:
--$l^{th}$--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,999,418 B2

In Column 14, Lines 6-7, formula (15):
"$E_m(k)=\Sigma_{i=0}^{N=1}m(i)^2$"
Should be replaced with:

-- $E_m(k) = \sum_{i=0}^{N-1} m(i)^2$ --